United States Patent
Rosenbaum

(10) Patent No.: US 6,577,749 B1
(45) Date of Patent: Jun. 10, 2003

(54) METHOD AND DEVICE FOR RECOGNITION OF DELIVERY DATA ON MAIL MATTER

(75) Inventor: Walter Rosenbaum, Paris (FR)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/509,385

(22) PCT Filed: Sep. 21, 1998

(86) PCT No.: PCT/DE98/02801
§ 371 (c)(1),
(2), (4) Date: Mar. 27, 2000

(87) PCT Pub. No.: WO99/16559
PCT Pub. Date: Apr. 8, 1999

(30) Foreign Application Priority Data

Sep. 27, 1997 (DE) .......... 197 42 771

(51) Int. Cl.[7] .............. G06K 9/00
(52) U.S. Cl. .............. 382/101; 382/310
(58) Field of Search ........... 382/101, 102, 382/182, 229, 231, 309, 310, 311, 317, 321; 379/910; 345/716, 727, 728, 978; 704/239, 236, 237, 251, 252

(56) References Cited

U.S. PATENT DOCUMENTS

| | | | |
|---|---|---|---|
| 4,921,107 A | * 5/1990 | Hofer | 209/546 |
| 4,992,649 A | 2/1991 | Mampe et al. | 209/546 |
| 5,022,081 A | * 6/1991 | Hirose et al. | 704/235 |
| 5,558,232 A | 9/1996 | Stevens et al. | 209/584 |
| 5,692,225 A | * 11/1997 | Bernardi et al. | 396/318 |

FOREIGN PATENT DOCUMENTS

| | | | |
|---|---|---|---|
| DE | 32 36 141 | 6/1983 | B07C/3/10 |
| DE | 195 31 392 | 1/1997 | G06K/9/48 |
| EP | 0 589 119 | 3/1994 | B07C/3/10 |
| EP | 0 726 540 | 8/1996 | G06K/9/03 |
| FR | 2 591 512 | 6/1987 | G06K/9/00 |
| JP | 359032068 A | * 2/1984 | G06K/9/03 |
| JP | 362202284 A | * 9/1987 | G06K/9/03 |

* cited by examiner

Primary Examiner—Andrew W. Johns
Assistant Examiner—Shervin Nakhjavan
(74) Attorney, Agent, or Firm—Venable LLP; Robert Kinberg

(57) ABSTRACT

The invention relates to a method and a device for detecting delivery data on mail items with the aid of video coding stations (40), to which the recorded, digitized and stored images of the mail item surfaces are transmitted, following an ambiguous automatic evaluation of the delivery data in an OCR unit (100). In the process, at least the names are entered by means of a voice-input unit (60, 70). The voice recognition candidates are then selected with the aid of the ambiguous results from the automatic OCR evaluation (120). It is advantageous if this occurs through a comparison of the respectively determined number of characters or by means of a position-related comparison of the characters for the candidates with the characters determined in the OCR unit and by taking into account the reliabilities.

11 Claims, 2 Drawing Sheets

METHOD AND DEVICE FOR RECOGNITION OF DELIVERY DATA ON MAIL MATTER

Figure 1:
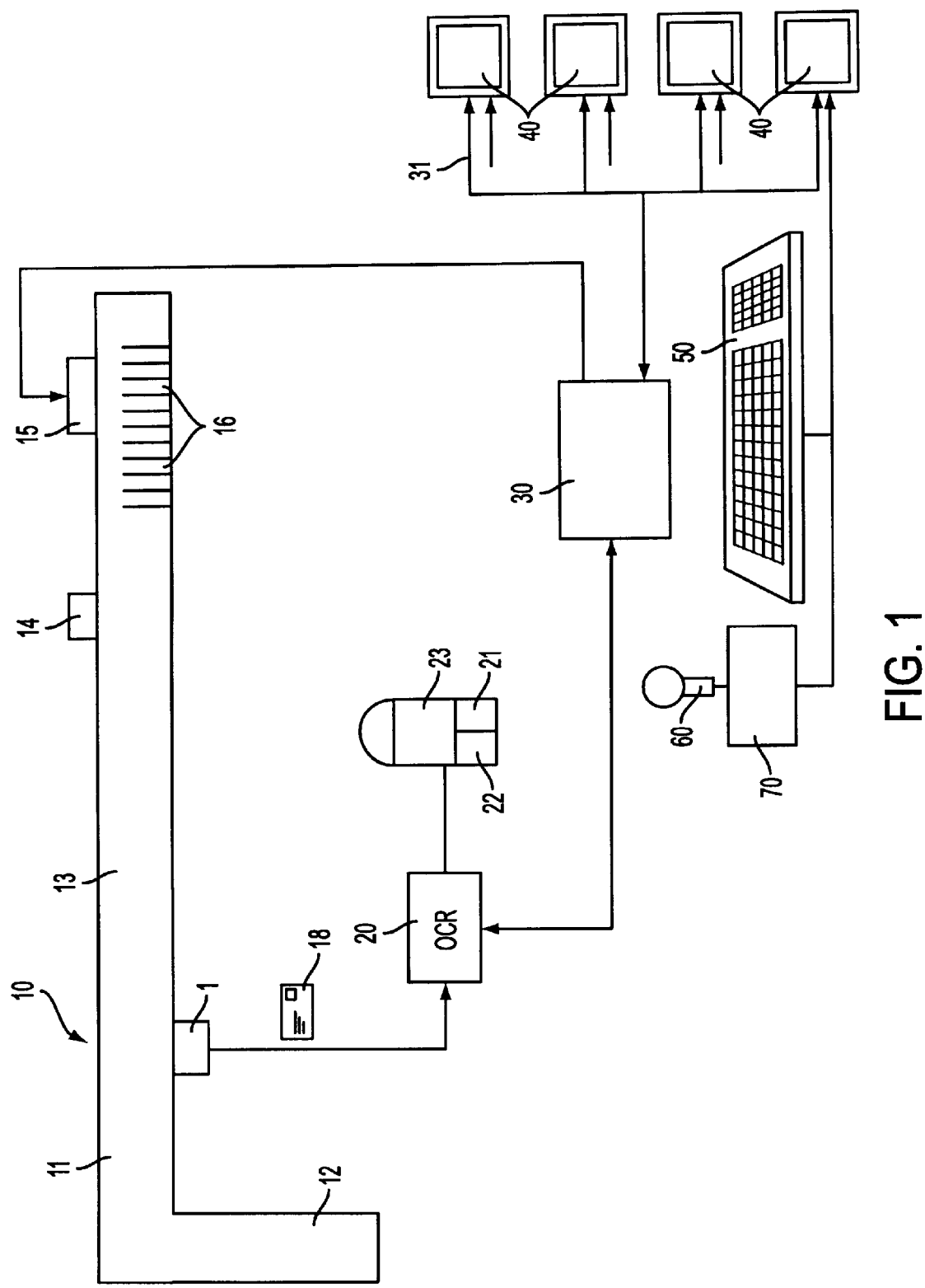

The invention concerns a method and a device according to the preambles to the independent claims and can be used with particular advantage for determining delivery data on mail items, written with non-alphabetical characters.

Systems for the automatic reading of delivery data, particularly addresses (OCR), are well known in the field of letter processing and are described, for example, in the German Patent 195 31 392. Processing rates of 10 letters per second, meaning 36 000 letters per hour and more, can be achieved with modern OCR letter sorting machines. However, the recognition reliability varies strongly, depending on the type of writing and the total quality of the address information affixed to the surface of the letters. In case of a successful recognition, the respective letter can be provided with a machine-readable bar code. This bar code permits a further mechanical processing up to an optional, desired sorting order. In particular, the use of bar codes permits a sorting of the letters up to the sorting level of the mail route, for which the letters are sorted based on the sequence in which the mailman delivers them.

Economic trends and an increasing postal volume in the Asian region have led to increased efforts in the automatic recognition of eastern characters in order to limit costs and to improve the mail service. In the process, the recognition systems must meet new requirements, relative to the situation in western countries where postal automation is already an established technology. These requirements stem from the fact that in most countries of the Asian region, Chinese characters are used for local postal addresses. In contrast to the letters of western alphabetical languages, Chinese characters are configured as ideograms. Each of these ideograms can represent a word. Instead of an alphabet containing thirty to sixty letters, 3,000 to 6,000 different Chinese characters are used daily, each with its own characteristic form. The virtual incompleteness of the Chinese character system and the ideographic structure of the individual characters lead to a reduced effectiveness of OCR systems, as compared to Western alphabetical systems of writing. In addition, problems result from the fact that addresses on postal items are oriented either in vertical or horizontal direction and that frequently a mixture of Chinese and western characters is used.

Since the recognition rates for automatic reading systems in general vary greatly for western as well as Chinese characters, these systems must be supported by using various forms of manual intervention. A manual sorting operation is the simplest type of intervention for rejected letters that cannot be read automatically. However, the resulting costs are uneconomically high as a result of increasing labor costs. Added to this is the fact that such manually sorted mail items cannot be sorted further mechanically without problems, not even at a later point in time, so that two separate mail item flows are generated, which must then be combined again manually at a specific point in time.

To avoid these disadvantages associated with the manual sorting of OCR-rejected mail items, various methods for a manual coding of postal goods have been developed. All of these methods make use of operator intervention to affix bar codes to the mail items in a manner that is consistent with the requirement of carrying out a mechanical sorting with the same machines that process the OCR-read and bar-coded postal goods.

Another method for coding rejected postal goods uses so-called manual coding stations. At these manually operated coding stations, the mail items are physically presented one after another to an operator. The operator then encodes each of these mail items with as much data as needed to clearly identify the delivery destination. In the process, the input address is converted to a sorting bar code with the aid of a directory and this bar code is affixed to the mail item. The coded mail items are then processed further with the aid of bar code sorters (BCS), which are mechanically identical to OCR-compatible BCS. The US Postal Service and the Royal Mail first introduced manual coding stations of this type in the 1970's. The main disadvantages of such devices are that mail items must be removed from the OCR flow of mail items and the ergonomic difficulties experienced by the operator during the recognition of mail items that are transported past.

The next improvement in the processing of OCR-rejected mail items was the development of on-line video coding systems (OVS). In an OVS, a video image of the mail item and not the physical item itself is presented to the operator at the manual coding station for the coding. The video image is shown to the operator while the physical mail item is held in a delay loop. Normally, the mail item is kept moving in these delay loops for a period of time that is sufficient for the OVS operator to input the necessary sorting data for the respective image. The standard delay loops permit a delay of between 10 and 30 seconds. The longer the delay loop, the higher the costs and requirements for maintenance and physical size of the facility.

The main problem when using the OVS is that the available time is only sufficient for a careful input of the zip code (ZIP) or the postal code (PC), unless impractically long delay loops are used.

As long as a ZIP or PC exists, OVS can also be used effectively for mail items having Chinese characters in the address. However, the share of such mail items is very low in many eastern countries and will remain low in the foreseeable future. For that reason, special coding methods were developed to keep the on-line delay time as low as possible.

In prior art, various method have been developed to increase the coding productivity and/or make it possible to list all address elements, meaning ZIP/PC, street/post office box, addressee/post office box, addressee/firm. Essentially these include the following:

Preview Coding

A simultaneous display of the images of two mail items, one above the other, is used for the preview coding. The lower image here is the active one, meaning the one for which data are encoded. Following a suitable training, operators can encode the information on the lower image while simultaneously recognizing visually the address information on the upper image. Subsequently, the upper image becomes active and the process is continued. The preview coding makes it possible to double the operator productivity through a complete overlapping of the cognitive and motor functions during the coding of successive images.

Extraction Coding

Owing to the fact that with the practically achievable on-line delay times, only the ZIP/PC address elements can be input reliably by the operator, certain key components of the address components that refer to the street are input during the extraction coding. The extraction coding normally is based on specially developed rules, for which a code with fixed length is used as access key to an address directory. For example, the Royal Mail uses an extraction formula, based on the first three and the last two letters. The operator must memorize special rules for this to avoid superfluous address information and to take into account certain differentiating characteristics, e.g. directions such as east, west or categories such as street, lane, and road.

The extraction coding has several significant disadvantages, despite its certain effectiveness. In particular, it has complex extraction rules that frequently require taking into account the end of a street name. However, these are normally the least legible components on hand-written mail items. In addition, there is a significantly high rate of ambiguous extractions, for which the extraction code corresponds to several entries in a directory, so that it is impossible to make an unambiguous sorting decision. Furthermore, it must be taken into account that the input productivity of the operators is reduced as soon as the operator must make decisions instead performing a simple, repetitive keyboard entry.

Completion Coding

In contrast to the extraction coding, a variable input for each address to be encoded is made with the completion coding. During the address input, the address is essentially compared to an address directory until an unambiguous match is found. By displaying the rest of the address, an acceleration effect is achieved as soon as an unambiguous partial match has been identified. However, problems occur with this technique in that the operator must be supplied with an input-stop signal and the remainder of the identified address must be displayed, which leads to reduced input productivity and makes a preview coding impossible.

Theoretically, all described video coding techniques can also be used for mail items with Chinese characters, even though they remain only marginally usable due to a lack of quick input techniques for Chinese characters.

Operator-assisted OCR Technique

The US Post Office has experimented with operator-assisted OCR techniques to increase the address information to be processed on-line. In order to increase the effectiveness, this technique emphasizes that part of the address image for which the OCR recognition has failed. Since the operators are slow when deciphering missing letters and complex recognition errors also occur at times, e.g. problems during the segmenting, the operator productivity with this method is frequently lower than for a simple re-entry of the respective address.

Off-line Coding

An off-line coding system, as described in the U.S. Pat. No. 4,992,649, was recently introduced since it is not possible to achieve a sufficiently high productivity with a pure on-line coding when using any of the above-mentioned coding techniques. With this system, mail items with unrecognized addresses are provided with an additional information, a tracking identification (TID). The unrecognized mail items are stored externally while the images of these mail items are presented to operators for coding, wherein time limitations do not exist. The mail items are subsequently presented to TID readers. The TID is linked with the input address information. Based on this, a standard bar code sorting information can also be affixed to the mail item, so that the respective mail item can be processed in the same way as standard OCR-read mail items. Even though the off-line video coding method is an effective method for coding all address components, there is still a need for additional capacities for the continued processing of mail items with unread addresses and a correspondingly complex logistic.

The operator-assisted OCR techniques are also basically suitable for processing mail items with Chinese characters, but do not yet permit a quick input of such characters.

This unsatisfactory situation is further aggravated by the fact that the operator must meet relatively high demands with respect to the necessary training and required knowledge.

To be sure, a quick input of the delivery data can take place with video coding and the use of voice input units. However, the time-related problems during the coding are only shifted to the phase for selecting delivery data candidates.

The invention, specified in the independent claims 1 and 9, is based on the problem of a quick encoding of delivery data in the form of addresses affixed to mail items, particularly those written by hand with non-alphabetical characters, by using voice-input techniques that require few selections by the personnel. Filtering the candidates obtained by means of voice input with the associated, incomplete or ambiguous results of the OCR evaluation permits a quick, automatic selection of the right candidate, without entrusting the operator with this process. This can be used with particular advantage when encoding hand-written addresses with Chinese characters.

Advantageous embodiments of the invention follow from the dependent claims. A keyboard input of the numerical components of the displayed delivery data is therefore favorable according to claim 2 in order to reduce the evaluation expenditure. According to claim 3, it is advantageous for the selection of candidates from the voice input if the number of characters determined in the OCR evaluation is compared to the number of characters from the voice recognition and those candidates are sorted out, for which the number of characters deviates by more than one statistically determined limit value from the number of characters determined in the OCR evaluation. According to claim 4, the segmenting result can be used for this.

In another advantageous selection process according to claim 5, the characters determined in the OCR evaluation and provided with reliabilities are compared position-related to the characters for the voice recognition candidates and the most reliable candidate, which is located above a limit value, is selected. According to claim 6, the following process steps are preferably carried out successively to determine a street name:

Checking the existence in an address data file/street directory;

Selecting the number of characters in a comparison with the number of characters determined in the OCR evaluation and Position-related comparison of the characters for the candidates and the characters from the OCR evaluation.

If the numerical components of the delivery information are input via keyboard, it is advantageous according to claim 7 and 8 to search for these numbers by using an OCR unit for numbers. These numbers are then used to detect the address lines, their orientation and the position of the name field in the address line.

Figure 2:
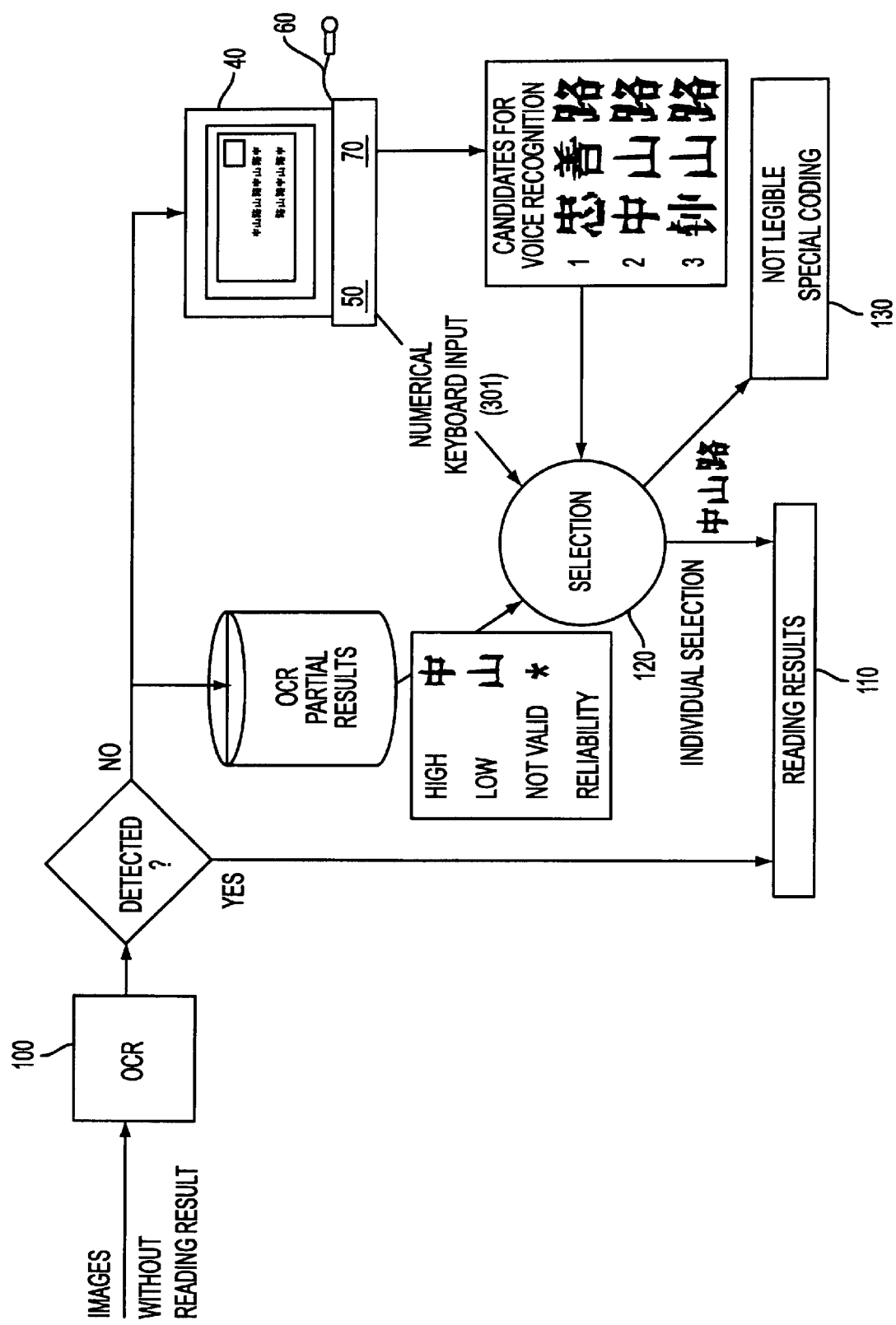

The invention is explained in further detail in the following with the aid of drawings:

Shown are in:

FIG. 1 A schematic representation of a device according to the invention;

FIG. 2 A data flow when encoding mail items containing Chinese characters.

FIG. 1 shows a schematic representation of a letter distribution system for realizing the method according to the invention. An OCR letter sorter 10 comprises a feeding device 11, which removes mail items successively from a magazine 12 and transports these at a rate of approximately 10 mail items per second to a high-resolution video scanner 17, which functions as device for obtaining images of the mail items. The mail items are subsequently transported in a delay loop 13. The mail items generally are provided on their surface with delivery data, in particular address information. The address information on the mail item images, obtained with the video scanner 7, is evaluated in an OCR unit 20. In case of a complete evaluation, a bar code printer 4 is actuated, and a corresponding bar code for the subsequent sorting into sorting racks 16 is affixed to the mail item. The OCR unit 20 contains one or several microprocessors 21 with associated memory 22 for storing the images of the mail items. The OCR unit furthermore comprises a dictionary 23 with ZIP codes, city names and street names and possibly additional address-related information. A feature-controlled reduction of the entry obtained from the address directory preferably occurs during the evaluation of the images containing the address information, so that a type of partial directory is created. In the process, reliabilities are assigned to the individual entries, so that a number of data for addresses that are recognized as being correct are created during the evaluation. The device furthermore contains a processing unit 30, as well as a number of video coding stations 40, which are connected directly to the processing unit 30 or via a local network (LAN) 31. Workstations are preferably used as video coding stations. If the OCR evaluation of an image was not completely successful, this image is transferred from the OCR unit 20 to the processing unit 30, which controls among other things a TID bar code printer 15 and transmits the corresponding image to one of the video coding stations 40. The TID bar code printer 15 provides the respective mail item with an identification code TID, which makes it possible at a later point in time to link the evaluated address information with the physical mail item. The evaluation of the images in this case occurs preferably off-line, even though an on-line evaluation with video coding is also possible in principle, given a sufficiently long delay time. In the latter case, the TID can also be applied at a later time to the mail items, that is to say if the video coding has not resulted in a complete evaluation within a predetermined time period.

As indicated schematically, a keyboard 50 for the input and a voice-input unit, consisting of a microphone 60 and a voice recognition module 70, are connected to each video coding station 40.

The selection according to the invention of a candidate from the voice recognition module 70 occurs in the processing unit 30. FIG. 2, which deals with the example of recognizing addresses written with Chinese characters, shows that it is advantageous but not necessary to also use an off-line OCR unit 100, through which the items pass once more in case of an incomplete or ambiguous result. If the result from this unit is unambiguous or complete, it is accepted 110 and the coding process is stopped. If not, the corresponding image is transferred to a video coding station 40 with a keyboard 50, a microphone 60 and a voice recognition module 70. The operator reads the address and speaks the street name into the microphone 60. At the same time, the operator enters the house number with the aid of keyboard 50. Following this, a new image with an address that has not been clearly or completely evaluated automatically is displayed on the monitor and a new coding operation is carried out.

According to FIG. 2, three candidates, consisting respectively of three characters, are determined with the voice recognition module 70. The incomplete evaluation in the off-line OCR unit 100 also resulted in the determination of three characters, wherein the first character was identified with high reliability, the second character with low reliability and the third character was not identified at all. The selection 120 of the candidates from the voice recognition module 70 then takes place in the processing unit 30. A street directory is initially checked with the aid of processing unit 30 to determine whether the three candidates with the entered house number 301 can be found. Since this is the case, a comparison of the number of characters takes place next. For the three candidates from the voice recognition, this comparison coincides with the result of the off-line OCR unit 100 (3 characters).

Thus, following this comparison, the three candidates remain selected and the characters are compared position-related by taking into account the reliabilities.

The OCR unit 100 could not identify an individual character in the last place, so that a selection comparison cannot be carried out for this place.

The OCR unit 100 detected a character with low reliability in the second place, which the candidates 2 and 3 also have in second place. A decision is therefore not yet possible. If the character in the first place, which is detected with high reliability in the OCR unit 100, is compared to the corresponding character for the candidates, it shows that only the candidate 2 comprises this character in the first place, so that this character is accepted as unambiguous solution. If an unambiguous selection of a candidate with statistically fixed reliability threshold is not possible, the image with the searched-for address is supplied to a special coding 130. The numbers input on the keyboard, here the house number 301, can be utilized to carry out a renewed OCR evaluation if the result from the OCR unit 100 is below a specified reliability. In this renewed OCR evaluation, the entered numbers are used to detect the position and orientation of the address line and the street name region.

Of course, it is also possible to enter the names and numbers by means of voice input and to filter and select the determined candidates with the OCR results.

What is claimed is:

1. A method for recognizing delivery data on mail items with the aid of video coding stations, to which the recorded, digitized and stored images of the mail item surfaces containing the delivery data have been transmitted following an ambiguous, automatic evaluation of the delivery data in at least one OCR unit, including a comparison with a directory, said method involving the input of at least the names of the respective delivery data, displayed on the respective video coding station monitor, by means of a voice input unit that comprises a microphone and a voice recognition module, wherein the voice recognition candidates are selected with the incomplete and/or ambiguous results of the automatic OCR evaluation.

2. A method according to claim 1, wherein the numerical components of the displayed delivery data are input with the aid of a keyboard.

3. A method according to claim 1, wherein the number of characters is determined in the OCR evaluation as accurately as possible and is compared to the number of corresponding characters for the voice recognition candidates and wherein those candidates are sorted out, for which the number of characters deviates by more than one statistically determined limit value from the number of characters detected in the OCR evaluation.

4. A method according to claim 3, wherein the number of characters is determined from the result of the segmenting of the OCR evaluation.

5. A method according to claim 1, wherein the characters determined in the OCR evaluation, to which reliabilities have been assigned, are compared position-related to the characters for the voice recognition candidates and wherein the candidate with the most reliable match above a statistically determined limit value is selected.

6. A method according to claim 1, wherein for the determination of a street name, first, the street name candidates with the associated house numbers that have been input are selected on the basis of their existence in a street directory, second, the remaining candidates are then selected based on the number of characters as compared to the determined number of characters from the OCR evaluation and third, the remaining candidates are selected in a position-related comparison of the characters for the candidates with the characters from the OCR evaluation.

7. A method according to claim 1, wherein a search is conducted with the aid of a number OCR unit in all possible ROI address fields for the numerical components of the delivery data that was input via keyboard and wherein the resulting numbers are used to determine the searched-for address line and its orientation.

8. A method according to claim 7, wherein the name field in the address line is determined with the aid of the numbers found with the number OCR unit and the position of said numbers.

9. A device for detecting delivery data on mail items, comprising a device for obtaining images of mail items (17), an OCR unit (20, 100) for the automatic evaluation of the images of mail item surfaces containing the delivery data, including a comparison with a directory, a device for video coding the images of the mail item surfaces containing the delivery data, said device having at least one video coding station (40) with respectively one keyboard (50), one monitor and one voice input unit that consists of a microphone (60) and a voice recognition module (70), a processing unit (30) for controlling the data flows between the input units and the output units of the device for video coding and the OCR unit (20, 100), wherein the candidates from the respective voice recognition module (70) are selected in the processing unit (30) with the aid of the incomplete and/or ambiguous results of the OCR unit (20, 100).

10. A device according to claim 9, wherein the number of characters determined in the OCR unit (20, 100) is compared in the processing unit (30) to the number of characters for the candidates from the respective voice recognition module (70) and wherein those candidates are sorted out, for which the character number deviates by more than one statistically determined limit value from the number of characters of the OCR unit (20, 100).

11. A device according to claim 9, wherein the characters determined in the OCR unit (20, 100), which have been provided with reliabilities, are compared in the processing unit (30) position-related to the characters for the candidates from the respective voice recognition module (70) and wherein the candidate that coincides with the highest reliability above a statistically determined limit value is selected.

* * * * *